(12) United States Patent
Berggren et al.

(10) Patent No.: US 9,369,950 B2
(45) Date of Patent: Jun. 14, 2016

(54) USER EQUIPMENT AND METHOD OF SEARCHING FOR A CELL

(71) Applicant: Sony Corporation, Tokyo (JP)

(72) Inventors: Anders Berggren, Lung (SE); Lars Nord, Lund (SE); Brian Alexander Martin, Farnham (GB); Yuichi Morioko, Reading (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/296,604

(22) Filed: Jun. 5, 2014

(65) Prior Publication Data
US 2015/0358894 A1 Dec. 10, 2015

(51) Int. Cl.
*H04M 3/42* (2006.01)
*H04W 48/16* (2009.01)
*H04W 48/20* (2009.01)
*H04W 76/02* (2009.01)
*H04W 52/02* (2009.01)

(52) U.S. Cl.
CPC .............. *H04W 48/16* (2013.01); *H04W 48/20* (2013.01); *H04W 76/023* (2013.01); *H04W 52/0209* (2013.01)

(58) Field of Classification Search
CPC .......... H04W 36/0005; H04W 36/005; H04W 36/0083; H04W 48/14; H04W 48/20; H04W 52/242; H04W 52/383; H04W 76/02; H04W 48/16; H04W 76/023; H04W 52/0209
USPC ............. 455/414.1, 412.1, 417, 432.3, 435.1, 455/434, 436, 437, 445, 447
See application file for complete search history.

(56) References Cited

U.S. PATENT DOCUMENTS

| | | | |
|---|---|---|---|
| 2010/0110999 A1 | 5/2010 | Li et al. | |
| 2011/0268101 A1* | 11/2011 | Wang | H04W 5/0053 370/344 |
| 2013/0157656 A1* | 6/2013 | Gao et al. | 455/434 |
| 2013/0183963 A1 | 7/2013 | Turtinen et al. | |
| 2013/0273924 A1* | 10/2013 | Hakola et al. | 455/450 |
| 2014/0050319 A1 | 2/2014 | Pang et al. | |
| 2014/0057670 A1* | 2/2014 | Lim et al. | 455/509 |
| 2014/0094213 A1* | 4/2014 | Khoshnevis et al. | 455/522 |
| 2014/0185529 A1* | 7/2014 | Lim | H04W 76/023 370/328 |
| 2014/0302773 A1* | 10/2014 | Jantunen et al. | 455/3.01 |
| 2014/0323126 A1* | 10/2014 | Ro et al. | 455/434 |
| 2015/0110038 A1* | 4/2015 | Yang | H04W 72/042 370/329 |
| 2015/0117375 A1* | 4/2015 | Sartori | H04W 56/001 370/329 |
| 2015/0215833 A1* | 7/2015 | Siomina | H04W 36/08 455/436 |
| 2015/0319724 A1* | 11/2015 | Chae | H04W 8/005 370/315 |
| 2015/0319745 A1* | 11/2015 | Seo | H04W 72/0406 370/329 |
| 2015/0327195 A1* | 11/2015 | Chiu | H04W 56/002 370/350 |
| 2015/0327201 A1* | 11/2015 | He | H04W 24/10 370/336 |

OTHER PUBLICATIONS

International Search Report for corresponding International Patent Application No. PCT/EP2014/076510 mailed Mar. 3, 2015.

* cited by examiner

*Primary Examiner* — Jean Gelin
(74) *Attorney, Agent, or Firm* — Renner, Otto, Boisselle & Sklar, LLP (57) ABSTRACT

A user equipment comprises a wireless interface for communication with a cellular communication network. The user equipment is configured to detect a device-to-device signal received from a further user equipment at the wireless interface. The user equipment is configured to search for a cell of the cellular communication network to camp on based on the device-to-device signal.

19 Claims, 5 Drawing Sheets

USER EQUIPMENT AND METHOD OF SEARCHING FOR A CELL

FIELD OF THE INVENTION

Embodiments of the invention relate to wireless communication. Embodiments of the invention relate in particular to a user equipment configured for communication with a cellular communication network, to communication systems and to methods performed by user equipments to search for a cell to camp on.

BACKGROUND OF THE INVENTION

With increasing popularity of mobile voice and data communication, there is an ever increasing demand for high-speed data communication. User equipment configured to connect to a communication network, e.g. smartphones, have advanced processing capabilities. For battery powered user equipments, power consumption is of significant importance in order to increase battery lifetime.

In legacy implementations, a search for a cell performed by a user equipment which moves out of coverage may consume considerable energy. When a user equipment moves out of coverage, in idle mode the user equipment will try to select another cell within the same radio access technology (RAT) network. If this is not successful, the user equipment will start to scan for other RAT network(s) and will determine whether the user equipment can register in the other RAT network(s). The rate at which these scans are performed may be altered, e.g. by reducing the rate over time. The network may not know that the user equipment is no longer pageable until a location update timer expires. The location update timer can be between 6 minutes and 24 hours, depending on network configuration.

Conventionally, user equipments will periodically scan supported frequencies, frequency bands and/or RAT technologies when out of coverage in order to try and obtain coverage. The speed at which the user equipment can find a cell to camp on comes at the expense of power consumption, when searching unsuccessfully. More frequent scanning decreases the time required for the user equipment to find a cell to camp on, but increases power consumption. When the time between searches is increased to reduce the power consumption, the user equipment will generally take longer to find coverage when it is available. When a user equipment is located at an edge of a cell, it may end up in a state in which it frequently scans supported frequencies, frequency bands and/or RAT technologies to find a cell to camp on, which increases power consumption. For illustration, when a user equipment repeatedly goes into and out of the coverage of a cell while being located at the edge of the cell, a reduction of the scan rate may not be efficient because the scan frequency timer may be reset frequently. Additionally or alternatively, a user equipment which is attached to a non-preferred RAT network may start scanning of the preferred RAT network in a too frequent manner. Such situations may lead to a high utilization of a radio and modem portion of the user equipment which may quickly drain the battery.

Some UE implementations may increase the time between searches the longer they are out of coverage in order to preserve battery. This can then result in the UE taking longer to find coverage when it is available. Depending on the UE implementation, UE might end up in a state that it scans quite frequently. This could be due to the UE is going in and out of the cell while being in the cell edge. In this case the scan frequency timer will be reset every time. It can also happen that the UE is attached to a non-preferred RAT and therefore starts scanning of the preferred RAT in a too frequent manner. These unwanted behaviours generate high utilization of the Radio and modem part, and will quickly drain the battery. On the other hand, there is a trade-off between too infrequent scanning and the increased power consumption. If the scanning is too infrequent the UE will be out of coverage even though there should be a cell to camp.

BRIEF SUMMARY OF THE INVENTION

There is a continued need in the art for devices, systems and methods which allow a user equipment to efficiently search for a cell to camp on. There is in particular a need for devices, systems and methods in which the user equipment can efficiently search for the cell when being located in proximity to an edge of the cell.

According to embodiments, a user equipment uses device-to-device signals received from a further user equipment which is in coverage of a cell when searching for the cell to camp on.

The user equipment may use the device-to-device signal in various ways. The user equipment may determine, based on the device-to-device signal, whether it has moved into partial coverage or into coverage of the cell. The user equipment may additionally or alternatively determine frequencies and/or times at which to search for signals transmitted by the cell, e.g. paging signals, based on the device-to-device signal. The device-to-device signal may carry cell information, such as information on a timing for paging, which may be used by the user equipment to scan for paging signals from the cell.

The user equipment may also camp on the further user equipment which transmits the device-to-device signal. In this state, the user equipment may both interpret messages which it receives from the cell and cell information included in the device-to-device signal. The user equipment may repeatedly attempt to camp on the cell while it camps on the further user equipment. A repetition rate at which the user equipment makes an attempt to camp on the cell may be pre-defined or may be configurable via system information, which may be relayed in the device-to-device signal.

A user equipment according to an embodiment comprises a wireless interface for communication with a cellular communication network. The user equipment is configured to detect a device-to-device signal received from a further user equipment at the wireless interface. The user equipment is configured to search for a cell of the cellular communication network to camp on based on the device-to-device signal.

The user equipment may be configured to identify at least one frequency at which to search for signals from the cell based on the device-to-device signal. Information on the at least one frequency may be relayed in the device-to-device signal.

The user equipment may be configured to identify several frequencies at which to search for signals from the cell based on the device-to-device signal. Information on the several frequencies may be relayed in the device-to-device signal.

The user equipment may be configured to limit the search for the signals from the cell to the several frequencies which are identified based on the device-to-device signal. The several frequencies may be a sub-set of the supported frequencies, with the several frequencies at which the search is performed by the user equipment being selected in response to the device-to-device signal.

The user equipment may be configured to determine at which times a scan of the several frequencies is performed to search for the signals from the cell based on the device-todevice signal. The device-to-device signal may relay information on the timing which is used by the user equipment to determine at which times it shall scan for signals from the cell.

The signals from the cell may be paging signals transmitted by a base station of the cell.

The user equipment may be configured to retrieve information on the cell from the device-to-device signal.

The user equipment may be configured to listen for a paging signal of the cell based on the information on the cell.

The information on the cell may comprise cell timing information.

The user equipment may be configured to determine whether it has moved into partial coverage of the cell based on the device-to-device signal. The user equipment may be configured to determine whether it has moved into coverage of the cell based on the device-to-device signal.

The user equipment may be configured to compute a signal strength of a base station of the cell at the location of the user equipment based on the device-to-device signal. The user equipment may compute an indicator for a distance of the user equipment from coverage of the cell based on the device-to-device signal.

The device-to-device signal may comprise information on a path loss from a base station of the cell to the further user equipment. The path loss from the base station to the further user equipment may be computed by the further user equipment. The further user equipment may be configured to transmit both the path loss and its own transmit power to the user equipment.

The user equipment may be configured to measure a further path loss for the device-to-device signal from the further user equipment to the user equipment. The user equipment may be configured to use the path loss and the further path loss to determine whether the user equipment has moved into partial coverage or into coverage of the cell.

The user equipment may be configured to camp on the further user equipment which transmits the device-to-device signal while searching for the cell of the cellular communication network. The user equipment may be configured to decode idle messages received from the cell at the further user equipment and forwarded or relayed to the user equipment at times which are determined based on the device-to-device signal. The user equipment may be configured to periodically try to camp on the cell. A rate at which the user equipment periodically tries to camp on the cell may be configurable, e.g. by information conveyed in the device-to-device signal.

The further user equipment may be in coverage of the cell.

The user equipment may be configured to scan for radio access technologies different from the cellular communication network if the search for the cell based on the device-to-device signal fails. Legacy procedures may be invoked selectively only if attempts to camp on the cell based on the device-to-device signal fail.

The device-to-device signal may be a device-to-device synchronization signal.

The device-to-device signal may be a device-to-device discovery signal or device-to-device communication signal.

A communication system according to an embodiment comprises a user equipment according to an embodiment and a further user equipment which is in coverage of a cell of a cellular communication network and which is configured to transmit a device-to-device signal to the user equipment.

A method of searching for a cell of a cellular communication network to camp on according to an embodiment comprises detecting, at a wireless interface of a user equipment, a device-to-device signal from a further user equipment. The user equipment may perform a cell search procedure based on the detected device-to-device signal to search for the cell to camp on.

The user equipment may identify one or several frequencies at which to search for signals from the cell based on the device-to-device signal to perform the cell search procedure.

The user equipment may identify times at which to search for signals from the cell based on the device-to-device signal to perform the cell search procedure.

The user equipment may retrieve information on the cell from the device-to-device signal, and may perform the cell search procedure based on the retrieved information. The retrieved information may comprise information on times and/or frequencies at which signals are transmitted by a base station of the cell. The retrieved information may comprise information on a timing of the cell.

The user equipment may be configured to determine based on the device-to-device signal whether the user equipment has moved into partial coverage of the cell. The user equipment may be configured to determine based on the device-to-device signal whether the user equipment has moved into coverage of the cell.

The device-to-device signal may include information on a path loss from a base station of the cell to the further user equipment. The user equipment may measure a further path loss for the device-to-device signal from the further user equipment to the user equipment. The user equipment may determine whether the user equipment has moved into partial coverage or into coverage of the cell based on the path loss and the further path loss.

In the method, the device-to-device signal may be a device-to-device synchronization signal.

In the method, the device-to-device signal may be device-to-device discovery signal or a device-to-device communication signal.

The method may be performed by the user equipment according to an embodiment.

Devices and methods according to embodiments allow a user equipment to use a device-to-device signal from a further user equipment in coverage when searching for a cell to camp on after the user equipment has moved out of coverage. Scans for signals from a base station of the cell may be limited in the frequency and/or time domain in accordance with the device-to-device signal.

BRIEF DESCRIPTION OF THE DRAWINGS

Embodiments of the invention will be described with reference to the accompanying drawings in which the same or similar reference numerals designate the same or similar elements.

DESCRIPTION OF EMBODIMENTS

Exemplary embodiments of the invention will be described with reference to the drawings. While some embodiments will be described in the context of specific fields of application, e.g. in the context of exemplary radio access technologies, the embodiments are not limited to this field of application. The features of the various embodiments may be combined with each other unless specifically stated otherwise.

While some embodiments will be described in which a user equipment uses device-to-device synchronization signals in cell search techniques, the user equipment may additionally or alternatively use other device-to-device signal, such as device-to-device discovery signals or device-to-device communication signals.

Figure 1:
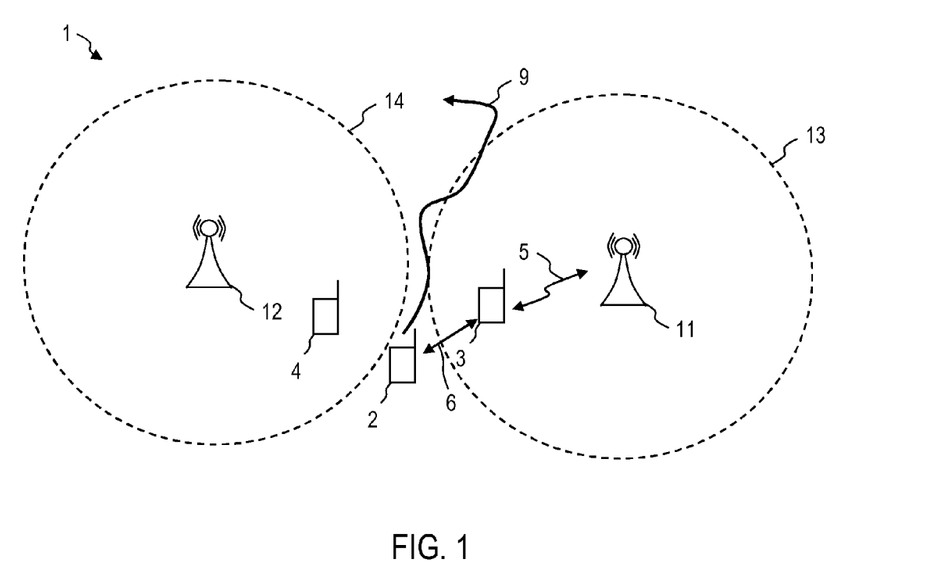
FIG. 1 is a schematic view of a communication system according to an embodiment.

FIG. 1 is a schematic view of a communication system 1 according to an embodiment. The communication system 1 comprises a user equipment 2. The communication system 1 may comprise at least one further user equipment 3, 4. The communication system 1 comprises a cellular communication network. The at least one further user equipment 3, 4 is in coverage of a cell 13, 14 of the cellular communication network. The cellular communication network has a radio access network (RAN). The radio access network includes a plurality of base stations 11, 12. The base stations 11, 12 may be operatively coupled to other nodes of the cellular communication network. The specific configuration of the cellular communication network, of the base station 11, 12 and of the other nodes of the cellular communication network depends on the communication standard. The cellular communication network may be a Long Term Evolution (LTE) network. In this case, the RAN is an evolved UMTS Terrestrial Radio Access Network (eUTRAN), with the base stations 11, 12 each being an evolved Node B (eNodeB) connected to a Mobility Management Entity (MME) and/or Serving Gateway (S-GW) in the core network.

As will be described in more detail below, the user equipment 2 has a wireless interface configured for communication with the RAN of the cellular communication network. The user equipment 2 may be configured to perform device-to-device discovery and device-to-device communication over the wireless interface. The user equipment 2 is configured to receive a device-to-device synchronization signal (D2DSS) transmitted by the further user equipment 3 which is in coverage of the cellular communication network. When the user equipment 2 has moved out of coverage, the user equipment 2 may use the D2DSS as an input parameter for a search for the cell 13 to camp on. The user equipment 2 may determine frequencies and/or times at which to scan for paging signals from the base station 11 based on the D2DSS. Alternatively or additionally, the user equipment 2 may determine how far it is from coverage of the cell, using the D2DSS received from the in-coverage further user equipment 3. Alternatively or additionally to using the D2DSS, the user equipment 2 may use a device-to-device discovery signal to search for a cell. Alternatively or additionally to using the D2DSS, the user equipment 2 may use a device-to-device communication signal to search for a cell. Alternatively or additionally, the user equipment 2 may camp on the further user equipment 3 in such a manner that the user equipment 2 both processes the D2DSS received from the further user equipment 3 and attempts to decode idle messages received from the base station 11.

The detection of the device-to-device signal, e.g. D2DSS may be performed in an efficient manner. For illustration, the D2DSS may be transmitted at one pre-defined frequency or at any one of a group of pre-defined frequencies. The group of pre-defined frequencies may be just a small sub-set of the frequencies supported by the user equipment 2 for communication over the wireless interface. By using the device-to-device signal, e.g. the D2DSS, the user equipment 2 may limit the search for paging signals or other idle messages from the base station 11 in the time domain and/or the frequency domain. For illustration, the times and/or subcarriers at which the user equipment 2 scans for paging signals or other idle messages from the base station 11 may be selected in dependence on the D2DSS.

Figure 2:
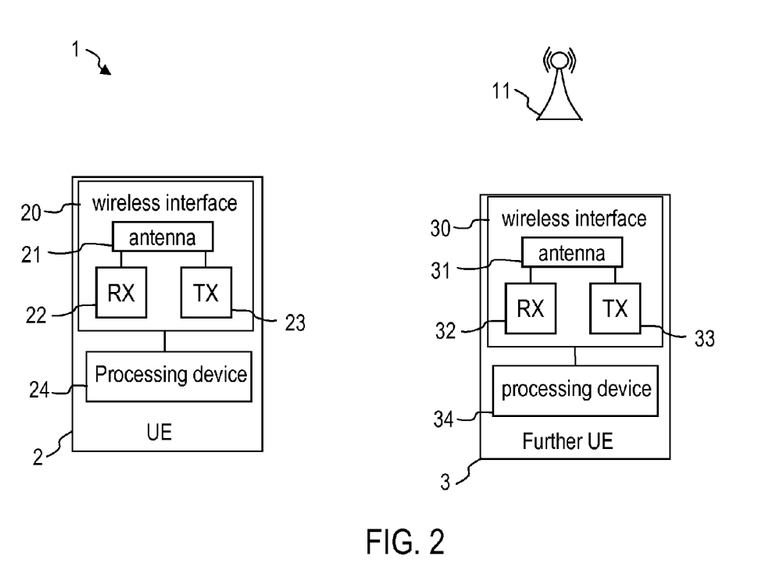
FIG. 2 is a schematic view of a communication system according to an embodiment.

FIG. 2 shows a block diagram view of the communication system 1 of FIG. 1.

The user equipment 2 has a wireless interface 20. The wireless interface 20 comprises an antenna 21, a receiver path 22 and a transmitter path 23. The wireless interface 20 is configured to communicate with the base stations 11, 12. The wireless interface 20 may be configured for communication over the eUTRA air interface. The wireless interface 20 may be configured to receive signals from the further user equipment 3 in device-to-device discovery or communication. The wireless interface 20 may be configured to receive a D2DSS which is transmitted by the further user equipment 3. The D2DSS is received at the wireless interface 20 directly from the further user equipment 3 in such a manner that the D2DSS is not received and processed in the radio access network of the cellular communication network.

The user equipment 2 may comprise a processing device 24 for processing signals received at the wireless interface 20. The processing device 24 may comprise one or several processors, one or several microprocessors, one or several controllers, one or several microcontrollers, one or several application specific integrated circuits or a combination thereof. The processing device 24 may be configured to control the wireless interface 20 to perform a search procedure to identify a cell to camp on. The processing device 24 may selectively activate and deactivate the wireless interface 20 and/or may control the frequencies at which the search for signals from the base station 11 is performed. The processing device 24 controls the wireless interface 20 such that the received D2DSS is used as an input in the search for the base station 11. The processing device 24 may determine whether the user equipment 2 is in partial coverage or in coverage of the cell 13, using information in the D2DSS. The processing device 24 may determine at which times and/or at which frequencies the scan for signals from the base station 11 is performed by the wireless interface 20. The processing device 24 may selectively activate and deactivate the receiver path to define the times at which the user equipment searches for signals from the cell. The processing device 24 may control one or several parameters of the receiver path 22 to limit the search for signals from the base station 11 to specific frequencies.

The further user equipment 3 comprises the wireless interface 30. The wireless interface 30 may comprise an antenna 31, a receiver path 32 and a transmitter path 33. The wireless interface 30 may be configured for communication over the eUTRA air interface. The wireless interface 30 may be configured to directly transmit signals to the user equipment 2 and/or receive signals from the user equipment 2. The wireless interface 30 may be configured to transmit the D2DSS to the wireless interface 20 of the user equipment. The D2DSS may be transmitted such that it is not received and processed in the radio access network of the cellular communication network.

The further user equipment 3 comprises a processing device 34. The processing device 34 may comprise one or several integrated circuits. The processing device 34 is configured to generate the D2DSS such that it includes information on the cell 13 served by the base station 11. The processing device 34 may be configured to generate the D2DSS such that it includes information on frequencies and/or a timing of paging signals of the base station 11. The processing device 34 may be configured to relay such information to the user equipment 2 in the D2DSS. The processing device 34 may alternatively or additionally be configured to detect the frequencies and/or timing of the paging of the base station 11 and may include information on the detected frequencies and/or timing of the paging in the D2DSS.

The processing device 34 may alternatively or additionally be configured to measure a path loss for signals between the base station 11 and the further user equipment 3. The processing device 34 may be configured to receive information on a transmit power from the base station 11. The processing device 34 may be configured to generate the D2DSS such that it includes information on the transmit power of the base station 11. The processing device 34 may be configured to generate the D2DSS such that it includes information on the path loss between the base station 11 and the further user equipment 3. The processing device 34 may include information on the transmit power of the further user equipment 3 in the D2DSS. The user equipment 2 may use these information elements to compute a path loss between the base station 11 and the user equipment. The user equipment 2 may be configured to determine whether it is in partial coverage or in coverage of the cell 13, using the path loss between the base station and the further user equipment, a further path loss between the further user equipment 3 and the user equipment 2 which may be measured by the user equipment 2, and the transmit power of the base station 11.

As will be described in more detail with reference to FIG. 3 to FIG. 7 below, when the user equipment 2 goes out of coverage, e.g. when it is not able to camp on any radio access technology (RAT) network, the user equipment 2 searches for a further user equipment 3 which transmits the device-to-device signal, e.g. the D2DSS. When the user equipment 2 receives the device-to-device signal, e.g. the D2DSS from the further user equipment 3 which is in coverage of the cell 13, the user equipment 2 may use this information to find the cell 13 to camp on. The device-to-device signal may convey information on the cell in which the further user equipment 3 is in coverage. The information may include cell timing, frequency, E-UTRA Absolute Radio Frequency Channel Number (EARFCN), physical cell identity, and/or other information relating to the cell.

The D2DSS may convey information on the transmission power of the base station 11, the path loss between the base station and the further user equipment 3 in the cell, and transmission power of the D2DSS, for example. The user equipment 2 may determine an estimate for its distance from coverage.

The D2DSS may also convey information on the frequencies and/or times at which the user equipment 2 shall search for signals from the cellular communication network. The number of frequencies and/or the times at which the user equipment 2 has to search for signals from the cellular communication network may be reduced thereby.

By using the device-to-device signal, e.g. the D2DSS to search for the cell to camp on, the user equipment may identify the cell more efficiently and, on average, may consume less power than legacy cell search algorithms. The device-to-device signal, e.g. the D2DSS may be sent at one or several pre-defined frequencies, and the user equipment may attempt to detect the device-to-device signal at the one or several pre-defined frequencies rather than scanning a larger number of frequencies at which a signal could potentially be received. The power consumption may be reduced when the user equipment is located at a boundary of the cell 13 or repeatedly moves into and out of coverage, which may be the case when the user equipment moves along a path 9 at the boundary of the cell 13.

Figure 3:
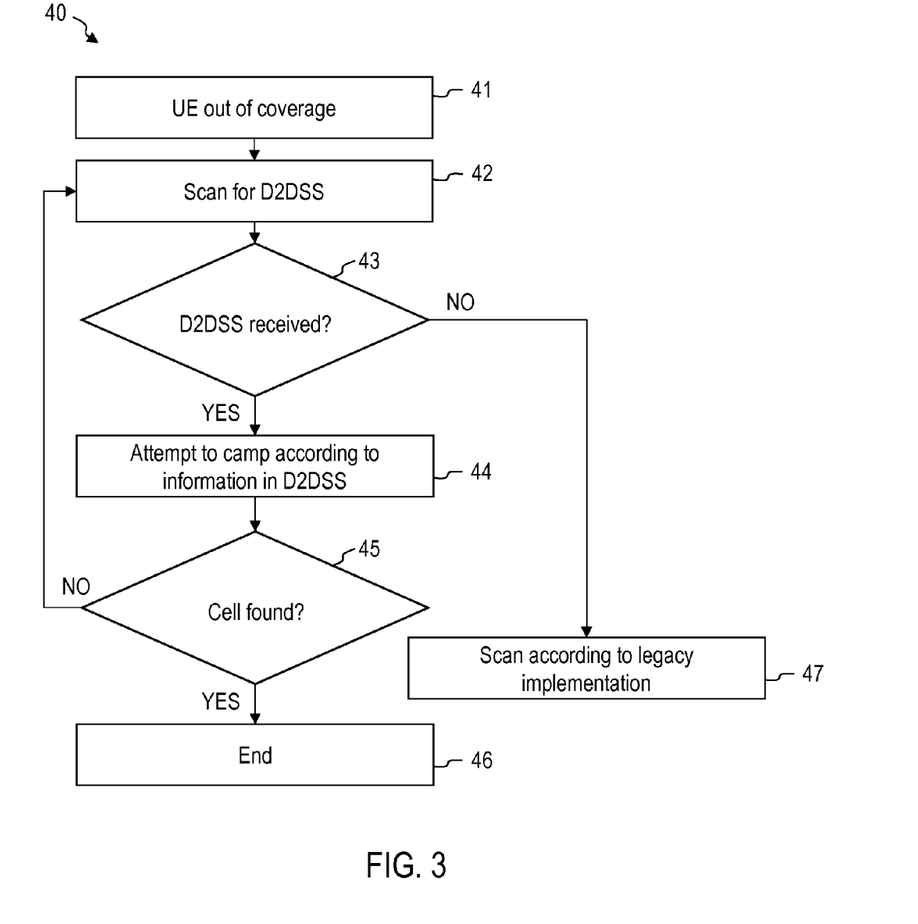
FIG. 3 is a flow chart of a method according to an embodiment.

FIG. 3 is a flow chart of a method 40 according to an embodiment. The method 40 may be performed by the user equipment 2 according to an embodiment. The processing steps may be performed by the processing device 24 of the user equipment 2.

The user equipment may have tried to camp on neighbours and RATs provided in the system information by the last base station. After failing that, the user equipment may be out of coverage at the beginning of the method 40.

At 41, the user equipment is out of coverage. The user equipment may start a search for a cell to camp on when it detects that it is out of coverage. The cell selection may be the initial cell selection or any cell selection.

At 42, the user equipment scans for a D2DSS from a further user equipment. The user equipment may monitor one or several known frequency locations, e.g. one or several carriers (EARFCN) or sub-carriers, at which the D2DSS will be sent. The frequency locations which are monitored by the user equipment to receive the D2DSS may be less than the frequency locations at which a synchronisation signal can be received from a base station.

At 43, the user equipment determines whether a D2DSS has been received.

At 44, if the D2DSS has been received, the user equipment may attempt to camp on the cell in which the further user equipment is located and from which the D2DSS has been received. The user equipment may scan for signals from the base station, with the frequency being selected in dependence on information included in the D2DSS. The user equipment may perform the scan of frequencies for detecting signals with a timing which depends on information included in the D2DSS. The D2DSS may carry a cell timing information which may be used by the user equipment to determine at which times the base station will transmit paging signals or system information, and to operate the receiver path for processing received signals in accordance with the timing. The D2D signal may carry additional information to assist with cellular network detection such as, but not limited to, physical cell identity.

At 45, the user equipment determines whether a cell has been found. If a cell has been found, the user equipment may camp on the cell. To this end, the user equipment may detect signals from the cell, synchronise, receive system information and then camp on the cell. The method may end at 46. If a cell has not been found the user equipment returns to step 42.

At 47, if the user equipment does not receive a D2DSS from a further user equipment which is in coverage and/or if the user equipment does not find a cell to camp on based on the information in the D2DSS, the user equipment may perform a scan for cells and/or other RAT networks. The user equipment may perform the scan according to a legacy implementation. The user equipment may first try to select another cell within the same RAT network. If this fails, the user equipment may scan for other RAT networks and will determine whether the user equipment may register in those RAT networks. The user equipment may continue to scan for a cell until it finds one. The time delay between successive scans may be increased, such that the scans are performed less frequently if the user equipment has been out of coverage for a longer time period.

The scan at 47 may require the user equipment to scan a greater number of frequencies to search for signals from the network than the scan which is performed at step 44. The detection of the D2DSS at step 42 may also be limited to a number of frequencies, e.g. to a number of subcarriers, carriers, or bands, which is less than the number of frequencies which are scanned at 47. The scan at 47 may be omitted when the user equipment manages to camp on a cell which is identified using the D2DSS. On average, the total power consumption may be reduced.

When the user equipment detects that it is out of coverage, it may also operate in a state which will be referred to as "D2D idle" state in the following and which will be explained in more detail with reference to FIG. 4 below.

In the D2D idle state, the user equipment may be configured to decode the D2DSS and possible other system information from the network. The D2DSS is received periodically from the further user equipment which is in coverage. The D2DSS may be received at a known frequency location or at one of several known frequency locations, e.g. one of several pre-defined subcarriers.

In the D2D idle state, the user equipment may also try to listen for paging signals according to the last cell in which the user equipment has been in coverage or according to the cell in which the further user equipment is located from which the D2DSS is received.

In the D2D idle state, the user equipment may attempt to camp on a RAT network. The attempt may be based on stored information. The attempt is based on information received in the D2DSS.

Figure 4:
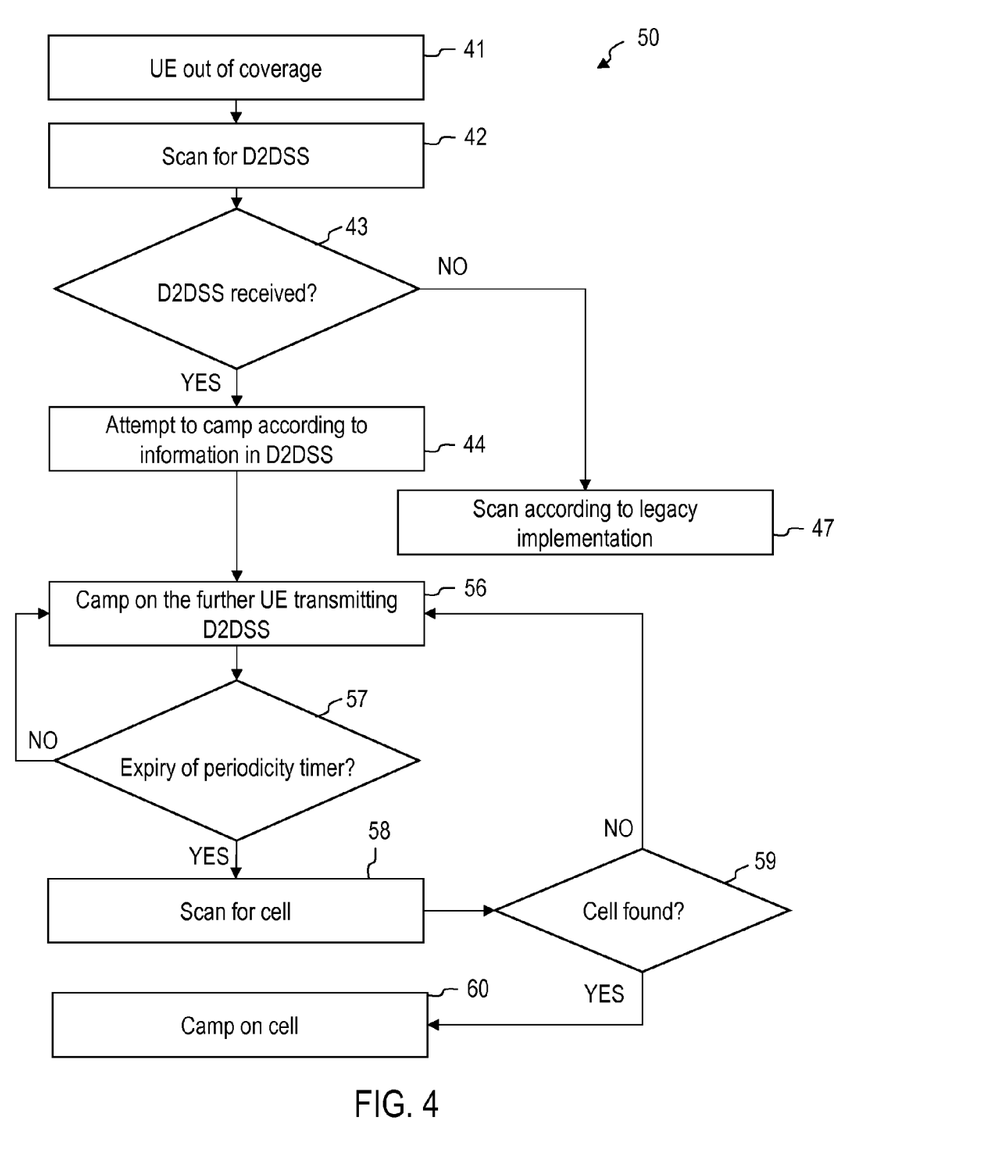
FIG. 4 is a flow chart of a method according to an embodiment.

FIG. 4 is a flow chart of a method 50 performed by a user equipment when operating in the D2D idle state. In the D2D idle state, the user equipment may monitor the periodically received D2DSS from a further user equipment. The monitoring may be repeated after a first time interval, which may correspond to the delay between successive device-to-device synchronization signals. The user equipment may attempt to camp on the RAT network using information from the D2DSS. Attempts to camp on the RAT network may be repeated after a second time interval, which may be larger than the first time interval. The second time interval, which defines the periodicity for attempting to camp on the cell of the cellular communication network, may be much larger than the first time interval.

Steps 41-44 and 47 of the method 50 may be implemented as described with reference to FIG. 3 above.

At 56, if the further user equipment which transmits the D2DSS has been found, the user equipment may camp on the further user equipment. The user equipment may monitor the device-to-device synchronization signals which are periodically received from the further user equipment to camp on the further user equipment. The user equipment may process the device-to-device synchronization signals to retrieve information on the cell in which the further user equipment is located. At 56, the user equipment may also try to listen for paging signals form the last cell the user equipment was camping on or the cell which the further user equipment is camping on.

At 57, the user equipment may monitor whether a periodicity timer has expires. The periodicity timer may define the first time interval after which the user equipment makes a new attempt to camp on the cell of the cellular communication network or on another RAT network. If the periodicity timer has not yet expired, the method returns to step 56.

At 58, if the periodicity timer has expired, the user equipment scans for paging signals or system information from the base station of the cell. The scan may be performed based on the information received in the D2DSS. The scan may additionally be performed based on stored information, e.g. information on preferred RAT networks or information on the cell in which the user equipment has been in coverage before it moved out of coverage. The user equipment may optionally also search for other RAT networks if it does not find the cell of the cellular communication network. At 58, the user equipment may also scan for signals from a cell other than the cell in which the further user equipment is located. For illustration, referring to FIG. 1, when the user equipment 2 uses the device-to-device signal from the further user equipment 3 in the cell search, it may nevertheless detect signals from the base station 12 when it has entered the coverage area of the base station 12. The user equipment may then camp on the cell 14.

At 59, the user equipment determines whether a cell to camp on has been found. If no cell has been found, the periodicity timer is reset and the method may return to step 56. If a cell has been found, the user equipment may camp on the cell at step 60.

In the D2D idle state, the user equipment has found a D2DSS to camp on. The user equipment can retrieve the cell timing and can understand when different messages are sent in time by the cellular communication network. In a partial coverage situation it is not guaranteed that the user equipment can receive all messages sent by the network. The user equipment can nevertheless still make an attempt to decode normal idle messages, for example. It is therefore possible to maintain a power consumption level which is the same as when the UE was camping on the base station of the cell.

In the D2D idle state, user equipment shall try to camp on the cellular network. These attempts can be repeated periodically. The periodicity for the repeated attempts to camp on the cell can be pre-defined. The periodicity for the repeated attempts to camp on the cell can be set to be the longest period defined for the repeated attempts in legacy search implementations, e.g. in the third generation partnership project (3GPP). The periodicity for the repeated attempts to camp on the cell can be configurable. The periodicity may be configurable via system information or via information conveyed in the D2DSS. The time for which the user equipment searches for the cell to camp on in each of the attempts may be set by the user equipment depending on whether the user equipment can detect the D2DSS and/or depending on the quality of the received signal.

Figure 5:
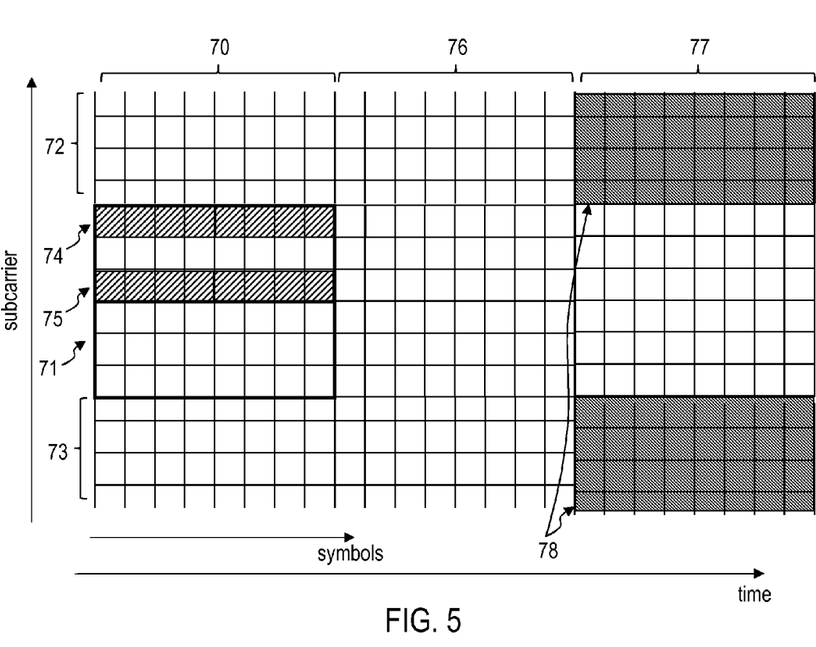
FIG. 5 is a diagram illustrating operation of a user equipment according to an embodiment.

FIG. 5 shows resources which are monitored by the user equipment according to an embodiment to scan for a cell. Several slots 70, 76, 77 may be resources for uplink communication. Each slot 70, 76, 77 may include a plurality of symbols. The symbols may be OFDM symbols. Other modulation schemes may be used. Frequency multiplexing may be performed. Several different subcarrier frequencies may be used for the simultaneous transmission of symbols, for example.

A physical resource block 71 may be allocated for the D2D discovery and/or for the D2D communication. The physical resource blocks 71 allocated for the D2D discovery and/or for the D2D communication may be periodic uplink resources. The physical resource blocks 71 may include one or several subcarrier frequencies. The D2DSS may be received by the user equipment in one pre-defined frequency 74 or in any one of a group of pre-defined frequencies 75. In the first step of the search algorithm in which the user equipment tries to detect a D2DSS from the further user equipment which is in coverage, the user equipment may monitor the pre-defined frequency 74 or in any one of a group of pre-defined frequencies 75 in which the D2DSS is known to be sent.

The D2DSS may include information on the cell timing and/or information on the frequency or frequencies at which the base station transmits paging signals and/or system information. The user equipment may retrieve the information from the D2DSS to determine in which slot(s) 77 and/or symbols it monitors for paging signals or system information from the base station. The user equipment may retrieve the information from the D2DSS to determine at which subcarriers 72, 73 it monitors for paging signals or system information from the base station. For illustration, the user equipment may scan several subcarriers 78 to detect paging signals or system information from the cellular communication network.

The search for signals from the cellular communication network may be limited in the time domain, e.g. to one or several slots 77, and/or in the frequency domain, e.g. to one or several subcarriers 72, 73, based on the D2DSS. The scan for the cell to camp on may thereby be performed more efficiently than in legacy implementations.

Figure 6:
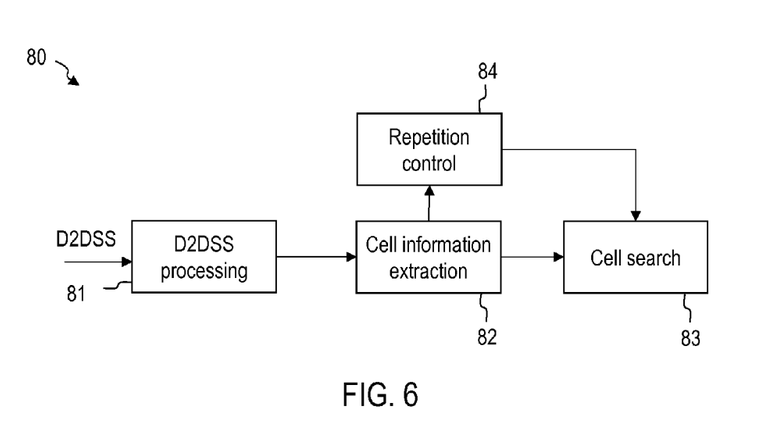
FIG. 6 is a functional block diagram of a processing device of a user equipment according to an embodiment.

FIG. 6 is a functional block diagram 80 of a user equipment according to an embodiment. The various functions may be performed by the processing device 24 of the user equipment 2.

The user equipment may comprise a D2DSS processing module 81. The D2DSS processing module 81 may be configured to receive and process the D2DSS which is periodically transmitted from a further user equipment. The D2DSS processing module 81 may be configured to detect the D2DSS at one or several pre-defined frequency locations.

The user equipment may comprise a cell information extraction module 82. The cell information extraction module 82 is configured to extract information on the cell in which the further user equipment is located which transmits the D2DSS. The information on the cell may comprise timing information. The information on the cell may comprise information on a transmit power of the base station and/or a path loss between the base station and the further user equipment.

The user equipment may comprise a cell search module 83 which searches for a cell to camp on. The cell search module 83 may perform the search with a timing which depends on the information on the cell extracted by the cell information extraction module 82. The cell search module 83 may limit a scan for signals from the base station, e.g. for paging signals, to frequencies which are defined by the information on the cell extracted by the cell information extraction module 82.

The user equipment may comprise a repetition control module 84 which determines a periodicity with which the user equipment attempts to camp on a cell of the cellular communication network or another RAT network. The periodicity may be set by the repetition control module 84 based on system information relayed in the D2DSS. The periodicity may be set by the repetition control module 84 based on system information which is received from the base station while the user equipment is in partial coverage. The periodicity may also have a fixed pre-defined value.

Figure 7:
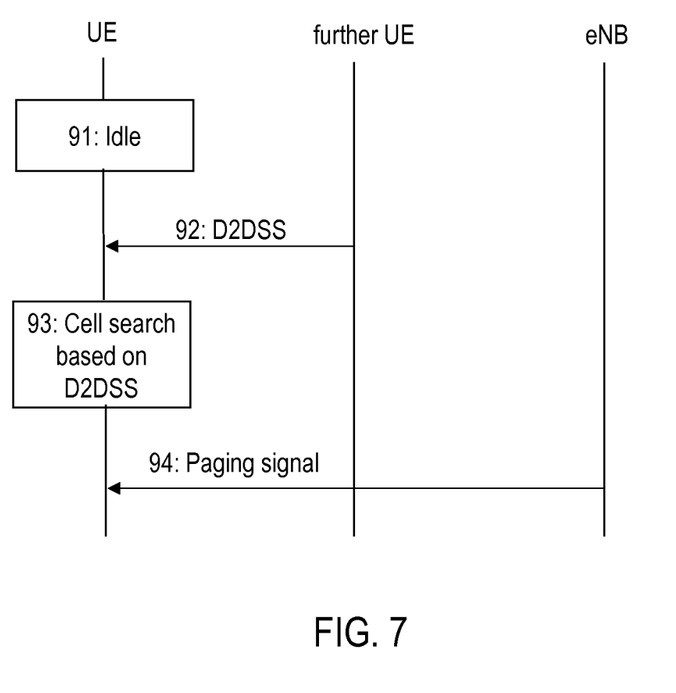
FIG. 7 is a diagram which shows a signalling in a communication system according to an embodiment.

FIG. 7 is a diagram which shows a signalling in a communication system according to an embodiment.

The user equipment may be in idle mode 91. The user equipment may be out of coverage while being in the idle mode 91. In order to find a cell to camp on, the user equipment may receive and process a D2DSS 92 from a further user equipment. The further user equipment which transmits the D2DSS may be in coverage of a cell.

The user equipment, while being in idle mode, may perform a search 93 for a cell to camp on. The search may be triggered by receipt of the D2DSS and may be performed based on the D2DSS. Information included in the D2DSS may be used to determine a timing and/or frequencies at which the user equipment monitors for signals from the base station to scan for the cell to camp on. The user equipment may receive a paging signal 94 from the eNodeB and may camp on the respective cell.

Various effects are attained by the devices, methods and systems according to embodiments. For illustration, the user equipment may utilize the D2DSS received from a further user equipment to find a cell to camp on in an efficient manner.

While exemplary embodiments have been described with reference to the drawings, modifications may be implemented in other embodiments. For illustration, the user equipment and the further user equipment may be portable telephone, machine type communication terminals, or other portable communication terminals. Further, while exemplary network technologies have been described, embodiments of the invention may be used in combination with other network technologies.

For further illustration, the user equipment may be configured to use device-to-device signals other than device-to-device synchronization signals in the cell search. The user equipment may use device-to-device discovery signals in addition to or instead of the D2DSS in the cell search algorithm. The user equipment may use device-to-device communication signals in addition to or instead of the D2DSS in the cell search algorithm.

Although the invention has been shown and described with respect to certain preferred embodiments, equivalents and modifications will occur to others skilled in the art upon the reading and understanding of the specification. The present invention includes all such equivalents and modifications, and is limited only by the scope of the following claims.

The invention claimed is:

1. A user equipment, comprising:
a wireless interface for communication with a cellular communication network,
wherein the user equipment is operative to
detect a device-to-device signal received from a further user equipment at the wireless interface, and
search for a cell of the cellular communication network to camp on based on the device-to-device signal, a scan for signals from a base station of the cell being performed in resources which are selected as a function of the device-to-device signal received from the further user equipment, the user equipment being operative to prioritize, based on the device-to-device signal received from the further user equipment, frequencies or times at which the user equipment searches for the signals from the base station.

2. The user equipment of claim 1,
wherein the user equipment is operative to identify at least one frequency at which to search for signals from the base station of the cell based on the device-to-device signal.

3. The user equipment of claim 2,
wherein the user equipment is operative to identify several frequencies at which to search for signals from the base station of the cell based on the device-to-device signal.

4. The user equipment of claim 3,
wherein the user equipment is operative to limit the search for the signals from the base station of the cell to the several frequencies identified based on the device-to-device signal.

5. The user equipment of claim 3,
wherein the user equipment is operative to determine at which times a scan of the several frequencies is performed to search for the signals from the base station of the cell based on the device-to-device signal.

6. The user equipment of claim 1,
wherein the user equipment is operative to retrieve information on the cell from the device-to-device signal.

7. The user equipment of claim 6,
wherein the user equipment is operative to listen for a paging signal from the base station of the cell based on the information on the cell.

8. The user equipment of claim 6,
wherein the information on the cell comprises at least one of cell timing information, physical cell identity, frequency, E-UTRA Absolute Radio Frequency Channel Number, EARFCN, or transmit power.

9. The user equipment of claim 1,
wherein the user equipment is operative to determine whether it has moved into coverage of the cell based on the device-to-device signal.

10. The user equipment of claim 9,
wherein the device-to-device signal comprises information on a path loss from the base station of the cell to the further user equipment,
wherein the user equipment is operative
    to measure a further path loss for the device-to-device signal from the further user equipment to the user equipment, and
    to use the path loss and the further path loss to determine whether the user equipment has moved into partial coverage or into coverage of the cell.

11. The user equipment of claim 1,
wherein the user equipment is operative to camp on the further user equipment which transmits the device-to-device signal while searching for the cell of the cellular communication network.

12. The user equipment of claim 1,
wherein the further user equipment is in coverage of the cell, and
wherein the device-to-device signal is a device-to-device synchronization signal, D2DSS, which includes information on the cell used in the search for the cell to camp on.

13. The user equipment of claim 1,
wherein the user equipment is operative to scan for radio access technologies different from the cellular communication network if the search for the cell based on the device-to-device signal fails.

14. A communication system, comprising:
a user equipment, and
a further user equipment which is in coverage of a cell of a cellular communication network and which is operative to transmit a device-to-device signal,
wherein the user equipment comprises a wireless interface for communication with the cellular communication network, and wherein the user equipment is operative to detect the device-to-device signal received from the further user equipment at the wireless interface, and search for the cell of the cellular communication network to camp on based on the device-to-device signal, a scan for signals from a base station of the cell being performed in resources which are selected as a function of the device-to-device signal received from the further user equipment, the user equipment being operative to prioritize, based on the device-to-device signal received from the further user equipment, frequencies or times at which the user equipment searches for the signals from the base station.

15. A method of searching for a cell of a cellular communication network to camp on, the method comprising:
detecting, at a wireless interface of a user equipment, a device-to-device signal from a further user equipment, and
performing a cell search procedure by the user equipment based on the detected device-to-device signal, the cell search procedure comprising scanning for signals from a base station of the cell in resources which are selected as a function of the device-to-device signal received from the further user equipment, wherein the user equipment prioritizes, based on the device-to-device signal received from the further user equipment, frequencies or times at which the user equipment searches for the signals from the base station.

16. The method of claim 15,
wherein performing the cell search procedure comprises:
    identifying several frequencies at which to search for signals from the base station of the cell based on the device-to-device signal.

17. The method of claim 15,
wherein performing the cell search procedure comprises:
    identifying times at which to search for signals from the base station of the cell based on the device-to-device signal.

18. The method of claim 15, further comprising:
retrieving information on the cell from the device-to-device signal,
wherein the cell search procedure is performed based on the retrieved information.

19. The method of claim 15,
wherein the device-to-device signal comprises information on a path loss from the base station of the cell to the further user equipment, and
wherein performing the cell selection procedure comprises:
    measuring, by the user equipment, a further path loss for the device-to-device signal from the further user equipment to the user equipment, and
    determining whether the user equipment has moved into partial coverage or into coverage of the cell based on the path loss and the further path loss.

* * * * *